United States Patent
Marshall (10) Patent No.: US 11,761,451 B1
(45) Date of Patent: Sep. 19, 2023

(54) AXIAL COUNTERBALANCE FOR ROTATING COMPONENTS

(71) Applicant: Blue Origin, LLC, Kent, WA (US)

(72) Inventor: Jordan Marshall, South Pittsburg, TN (US)

(73) Assignee: BLUE ORIGIN, LLC, Kent, WA (US)

( * ) Notice: Subject to any disclaimer, the term of this patent is extended or adjusted under 35 U.S.C. 154(b) by 0 days.

(21) Appl. No.: 18/150,329

(22) Filed: Jan. 5, 2023

Related U.S. Application Data (63) Continuation of application No. 17/662,650, filed on May 9, 2022, now Pat. No. 11,555,503.

(51) Int. Cl.
  *F04D 29/041* (2006.01)
  *F04D 13/04* (2006.01)
  *F02K 9/48* (2006.01)

(52) U.S. Cl.
  CPC ......... *F04D 29/0416* (2013.01); *F04D 13/04* (2013.01); *F02K 9/48* (2013.01)

(58) Field of Classification Search
  CPC .... F04D 29/0416; F04D 13/04; F04D 29/046; F02K 9/48; F05D 2240/52; F05D 2240/53; F05D 2260/15; F01D 3/04; F01D 25/16
  See application file for complete search history.

(56) References Cited

U.S. PATENT DOCUMENTS

2013/0115042 A1  5/2013  Mariotti et al.
2015/0330220 A1  11/2015  Asti et al.

FOREIGN PATENT DOCUMENTS

CN  202194866 U  4/2012

*Primary Examiner* — Jacob M Amick
*Assistant Examiner* — Charles J Brauch
(74) *Attorney, Agent, or Firm* — Summit Patents PC

(57) ABSTRACT

A rocket engine propulsion system having improved engine performance is described herein. The rocket engine propulsion system includes an axial counterbalance to reduce or eliminate axial thrust exerted on components of a turbopump. The axial counterbalance can allow for a larger range of axial thrust forces while coupling this ability to a rotational speed (e.g., rotations per minute, or RPM) of a shaft. The axial counterbalance includes a protrusion on that extends circumferentially around a shaft that mates with a protrusion on a swing arm. The swing arm is rotatably attached to a bracket which is constrained by a static support.

22 Claims, 12 Drawing Sheets

AXIAL COUNTERBALANCE FOR ROTATING COMPONENTS

CROSS-REFERENCE TO RELATED APPLICATIONS

This application is a continuation of and claims priority to U.S. patent application Ser. No. 17/662,650, filed May 9, 2022, and titled AXIAL COUNTERBALANCE FOR ROTATING COMPONENTS, the contents of which are hereby incorporated by reference in their entirety.

BACKGROUND

Propulsion systems are used in many, if not every, vehicle, including airplanes, automobiles, rockets, and the like. Many vehicle propulsion systems use liquid propellants. In a rocket, for example, the liquid propellant is pumped into a combustion chamber via a turbopump driven by a gas turbine. The resulting exhaust is typically directed through a nozzle to produce thrust, which is the force that moves the vehicle through a medium, such as an airplane through the air or a rocket through air, space, or both.

The turbopump takes a low-pressure fluid and converts the low-pressure fluid to a high-pressure fluid that interacts with various axial components of the turbopump (e.g., turbines, impellers, etc.). The conversion of a low pressure to a high pressure generates a force on each of the axial components of the turbopump. A net force in either an impeller direction or a turbine direction is generated along the axis of the turbopump due to unequal forces exerted on the turbopump components. This net force results in axial thrust, such that a shaft and any components attached thereto translate along an axis.

Conventional turbopumps use a pressure-assisted design, which routes high-pressure fluid to a thrust piston to help reduce the axial thrust load. Other conventional turbopumps transfer or place the axial load to or on, respectively, the bearings, including hydrostatic thrust bearings.

Conventional systems for counteracting an axial force within a turbopump have limited capability or ranges of use, require consistent or constant maintenance, require reliable calculations or components, or the like.

The state of the art would benefit from an improved and more efficient turbopump.

DETAILED DESCRIPTION

Turbopumps having improved engine performance are described herein. Conventional turbopumps include systems for counterbalancing axial forces. These conventional systems have limited capability or ranges of use, require consistent or constant maintenance, require reliable calculations or components, or the like. Axial thrust can be detrimental to the life and reliability of the turbopump, including any bearings and other components. Transferring or placing the axial load to or on the bearings is limited to a narrow range of axial thrust capabilities (i.e., too much axial thrust damages the bearings, too little does not provide enough bearing stiffness). Axial thrust analysis, therefore, becomes critical. A miscalculation can lead to critical failures (e.g., the turbopump seizes or no longer pumps a propellant to a combustion chamber) or an unnecessary increase in mass, such as to overcome the axial thrust. These critical failures, mass increases, or critical failures and mass increases can reduce engine performance or can result in non-functional engines.

The disclosed axial counterbalance reduces or eliminates axial forces exerted on components of a turbopump. A conversion of a low pressure to a high pressure by the turbopump generates the forces on the axial components of the turbopump. A net force in either an impeller direction or a turbine direction is generated along the axis of the turbopump due to unequal forces exerted on the turbopump components. This net force results in axial thrust, such that a shaft and any components attached thereto translate along an axis. The disclosed axial counterbalance can offset the axial thrust by generating thrust or forces in an opposing direction.

The disclosed system couples the capabilities of the axial counterbalance to rotations of a shaft of a turbopump. Therefore, the criticality of axial thrust predictions is reduced. The axial thrust predictions require advanced knowledge or anticipation of forces, which can be incorrect once implemented in an actual turbopump. The axial counterbalance, being coupled to the shaft, adjusts to offset axial thrust.

The disclosed axial counterbalance can also simplify startup and shutdown transients for turbopumps, such as by increasing the efficiency of kinetic energy conversion to pressure energy. The axial counterbalance can also increase the specific impulse of the engine—a measurement of how effectively a rocket uses propellant or how effectively a jet engine uses fuel. Therefore, turbopump performance and efficiency can be improved. Reducing or eliminating axial thrust can also reduce engine wear.

For example, an angular momentum of the axial counterbalance can offset the axial forces of a rotor of the turbopump (e.g., a shaft with one or more components attached thereto or interacting therewith), which reduces or eliminates the axial forces exerted on the components of the turbopump. The axial counterbalance can offset a larger range of axial forces while coupling this ability to a rotational speed (e.g., rotations per minute, or RPMs) of a shaft. The increase in RPMs can increase angular momentum of the axial counterbalance. The increase in angular momentum can be used to offset (i.e., reduce or eliminate) increasing or larger axial forces.

The disclosed axial counterbalance includes a to produce a force in a direction opposite a direction of a force produced by or exerted on a shaft or rotor of a turbopump. For example, the force generator can be a rack and pinion system in which the rack can be teeth extending circumferentially around a shaft and the pinon can be teeth extending outwardly from a swing arm. The teeth of the shaft fit into the spaces between the teeth of the swing arm. The teeth of the shaft can engage and interact with the teeth of the swing arm. As the shaft moves along an axis due to the axial force exerted on the shaft, the teeth of shaft push the teeth of swing arm in the same direction. The swing arm, being rotatably attached to a bracket, rotates around an axis. The bracket is attached to and constrained by a static support.

The swing arm can also include a weight on an end of the swing arm opposite the first end to increase the mass of the swing arm. In one example, the swing arm, in a nominal or initial position, can be perpendicular to the shaft. Then, as the shaft and the bracket move, the swing arm rotates, which causes the angle of the swing arm to change relative to the shaft.

In another example, the force generator can be a spring. The spring can be fixed at both end points (i.e., an attachment point on a casing and a bracket) or can be fixed at one end point and slidable at another end point (i.e., slidable with respective to the casing and fixed to the bracket). The spring can provide a tensive force, a compressive, or a pre-loaded force.

The turbopump can be used in a propulsion system for a rocket, whether or not in low or ultra-low gravity. The turbopump can further be used in another propulsion system, whether or not in low or ultra-low gravity.

Figure 1:
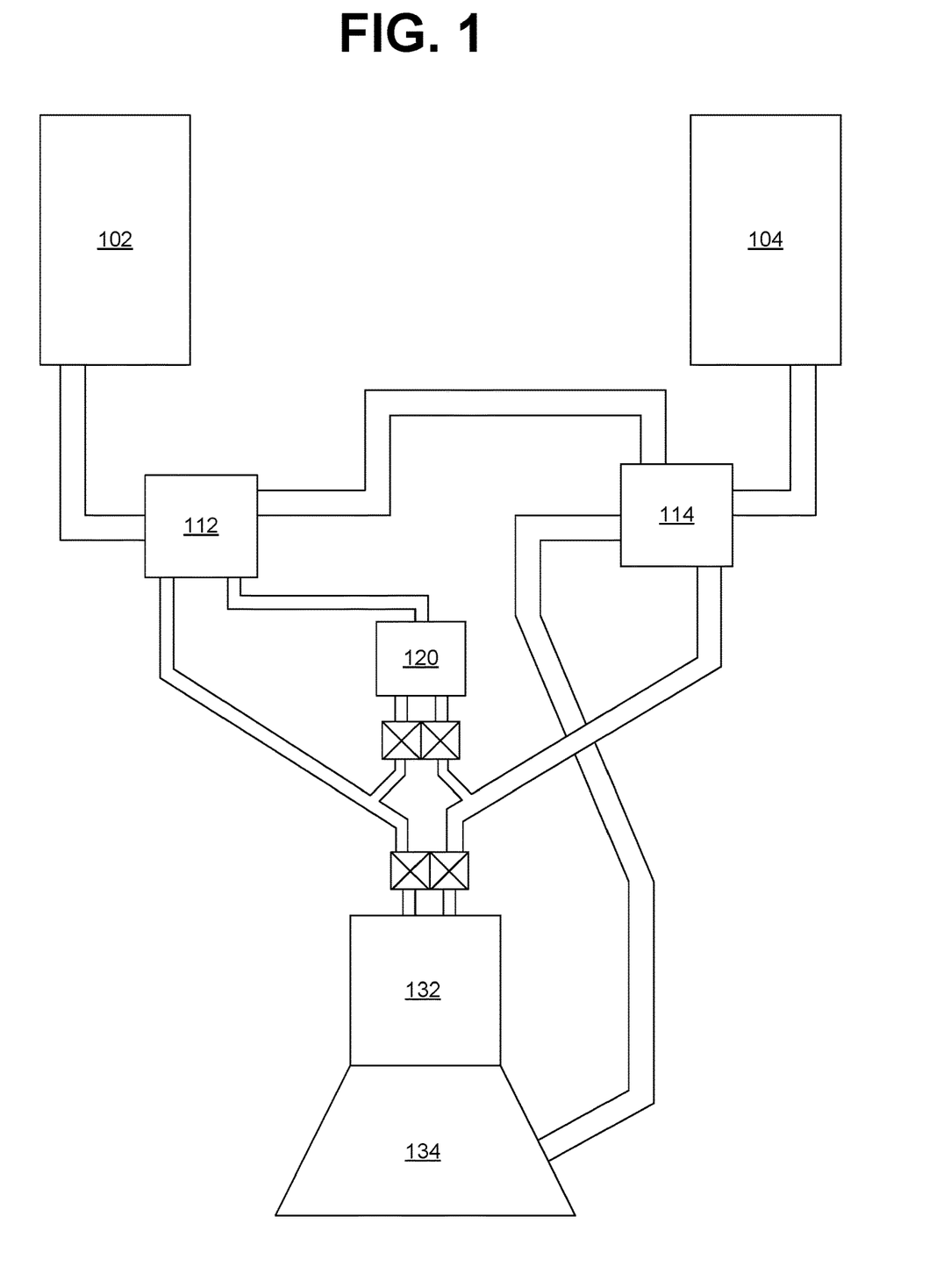
FIG. 1 illustrates an example rocket engine propulsion system.

FIG. 1 shows a rocket engine propulsion system 100. The rocket engine propulsion system 100 generates thrust by expelling exhaust generated by combusting a propellant (i.e., monopropellant), two propellants (i.e., bipropellant), or three propellants (i.e., tripropellant). Though the rocket engine propulsion system 100 is discussed herein as being bipropellant (i.e., using two propellants), the systems, components, and methods can be applied to a monopropellant engine or a tripropellant engine.

The rocket engine propulsion system 100 includes an oxidizer tank 102 to store an oxidizer (i.e., a first liquid propellant) and a fuel tank 104 to store a fuel (i.e., a second liquid propellant). The oxidizer can be liquid oxygen. The fuel can be liquid hydrogen.

The oxidizer is fed to a combustion chamber 132 via an oxidizer turbopump 112. The fuel is fed to the combustion chamber 132 via a fuel turbopump 114.

The combustion chamber 132 is a vessel which receives the two liquid propellants of a bipropellant engine (e.g., oxidizer and fuel) and in which the two liquid propellants undergo combustion to produce exhaust. The exhaust is passed through a nozzle 134 to increase exhaust flow and produce thrust.

The rocket engine propulsion system 100 also includes a gas generator 120 which produces gas used to power a turbine. The gas or steam can also be used to power a turbine of a rotor of the fuel turbopump 114. The gas can be generated by burning some of at least one liquid propellant within the gas generator 120. The gas generator 120 is in fluid communication with the turbine 226.

Figure 2A:
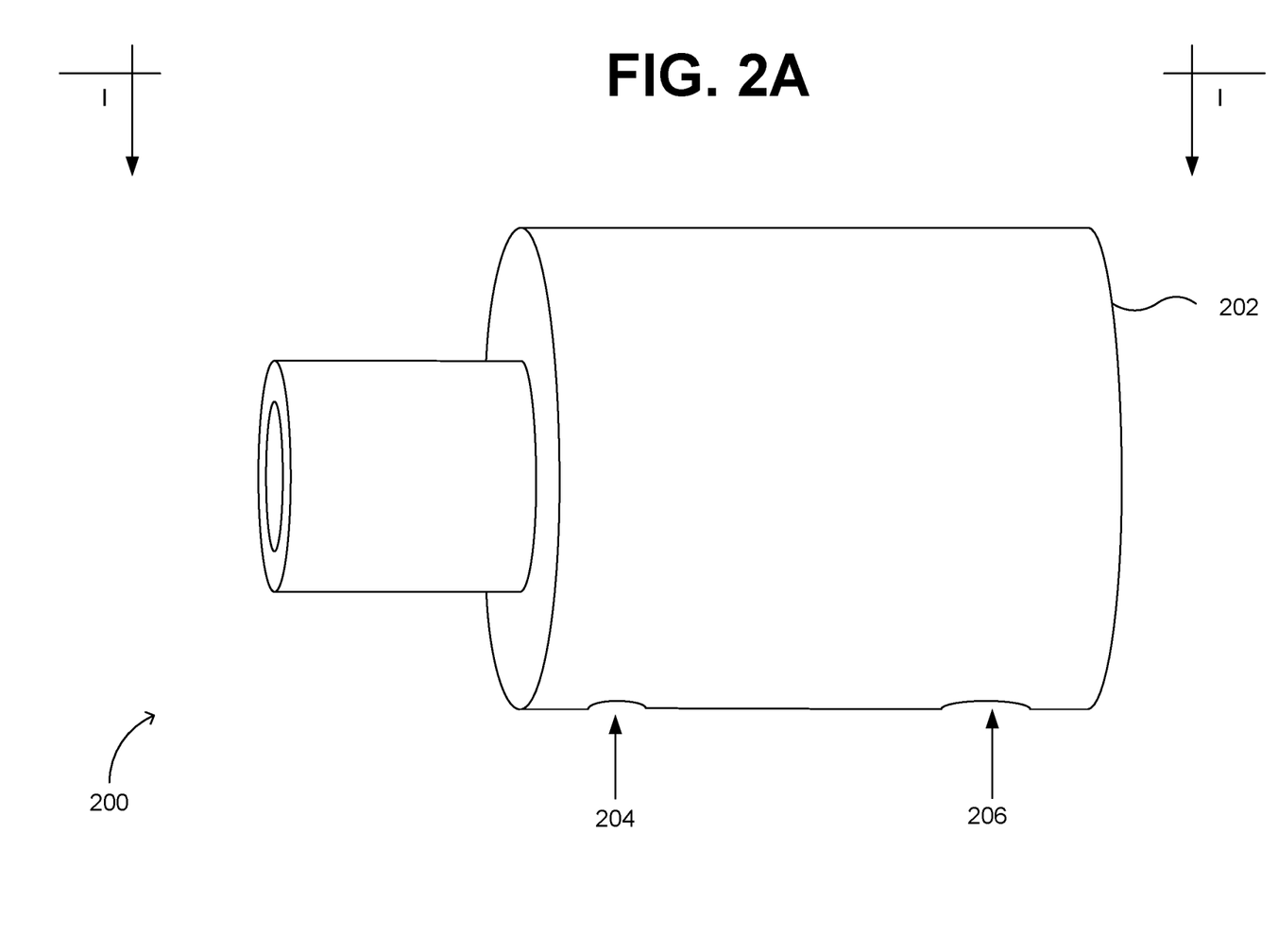
FIG. 2A illustrates an example turbopump.
Figure 2B:
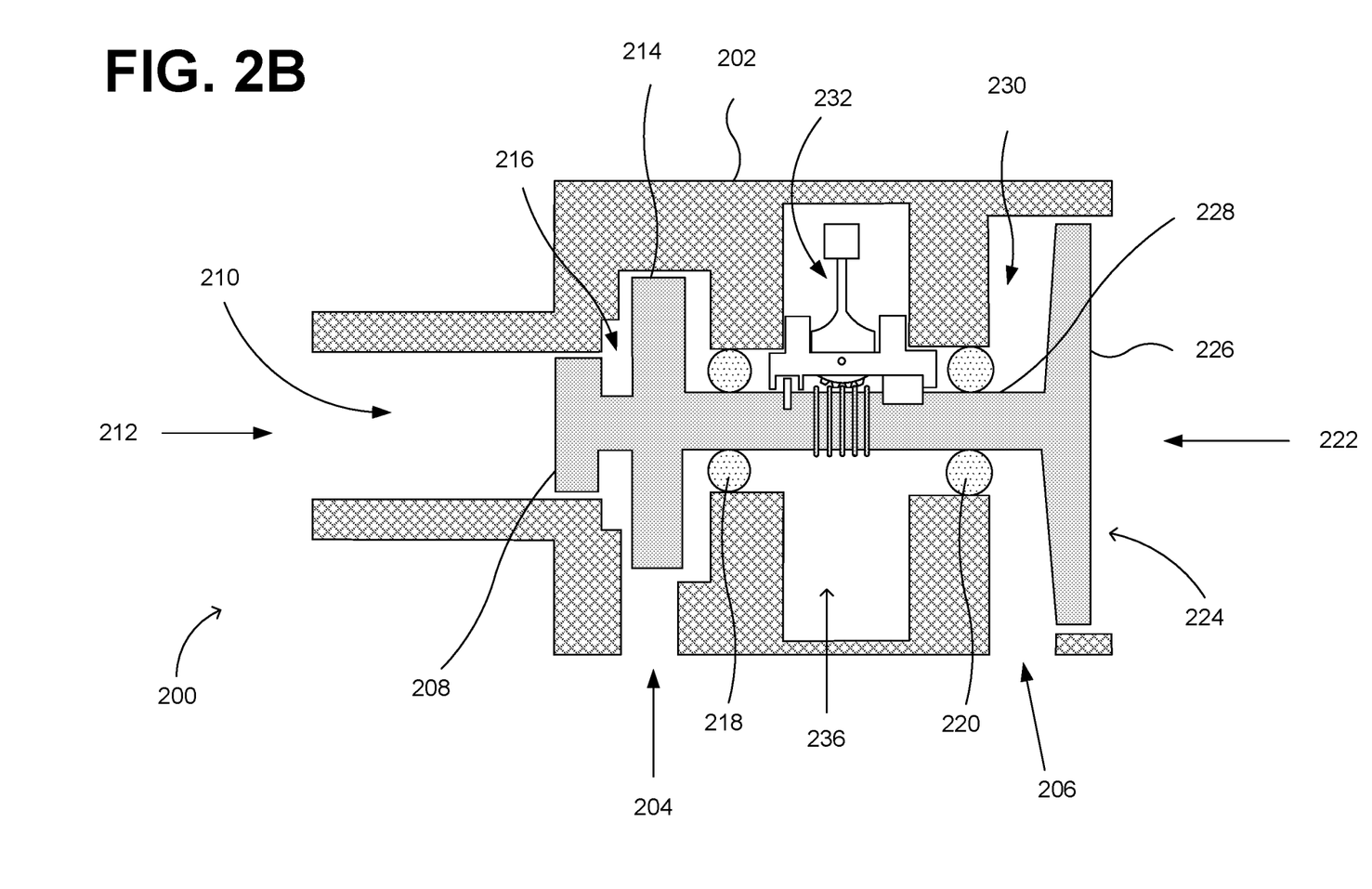
FIG. 2B illustrates a cross-section of the example turbopump of FIG. 2A.

FIG. 2A shows a turbopump 200. The turbopump 200 represents the oxidizer turbopump 112, the fuel turbopump 114, or both the oxidizer and fuel turbopumps 112, 114. FIG. 2B shows a cross-sectional view of the turbopump 200 along the line I-I of FIG. 2A. The turbopump 200 includes a casing 202, a rotor 224, and an axial counterbalance 232.

The rotor 224 includes an inducer 208, an impeller 214, and a turbine 226. The inducer 208, the impeller 214, and the turbine 226 are adjoined by a shaft 228. The shaft 228 can be formed from a single piece or multiple pieces. For example, a single piece shaft extends from the inducer 208 through the impeller 214 and to the turbine 226. As another example, a multiple piece shaft includes a first piece extending from the inducer 208 to the impeller and a second piece extending from the impeller 214 to the turbine 226.

The inducer 208 reduces a net positive suction head (NPSH), which reduces cavitation as compared to a system without an inducer. The turbopump 200 includes an inducer tunnel 210 and the inducer 208 in or proximal to the inducer tunnel 210 to reduce the NPSH. NPSH is the difference between the NPSH available (NPSHa) at a pump inlet 212 and the NPSH required (NPSHr) by the turbopump 200 to operate without cavitation.

The pump inlet 212 is in fluid communication with an impeller chamber 216 via the inducer tunnel 210.

The impeller 214 transfers energy, such as that of the rotor 224, to the liquid propellant to increase the pressure and flow of the liquid propellant.

The turbine 226 converts energy provided by gas (or steam, where appropriate) into mechanical energy via rotation of the shaft 228 to cause the inducer 208 and the impeller 214 to rotate.

The casing 202 houses, protects, and provides structure for other components of the turbopump 200. The casing 202 includes the pump inlet 212 in fluid communication with a pump outlet 204 via the impeller chamber 216. The pump inlet 212 can be a hole or opening to receive the propellant from the propellant tank. The pump outlet 204 can be a hole, opening, or channel from which the propellant is expelled and directed to the combustion chamber 132. The impeller chamber 216 is a space or cavity within the casing 202 being sized and shaped to house the impeller 214.

The casing 202 also includes an internal cavity 236 which extends circumferentially around a portion of the shaft 228 and the axial counterbalance 232. The internal cavity 236 is sized and shaped to accept the axial counterbalance 232. The internal cavity 236 can be formed by an internal wall of the casing 202 or by a static support attached to an internal portion or an internal side of a sidewall of the casing 202. The internal wall or the static support provide a surface against which the axial counterbalance 232 can press, such as to dissipate energy via frictional forces.

Figure 7A:
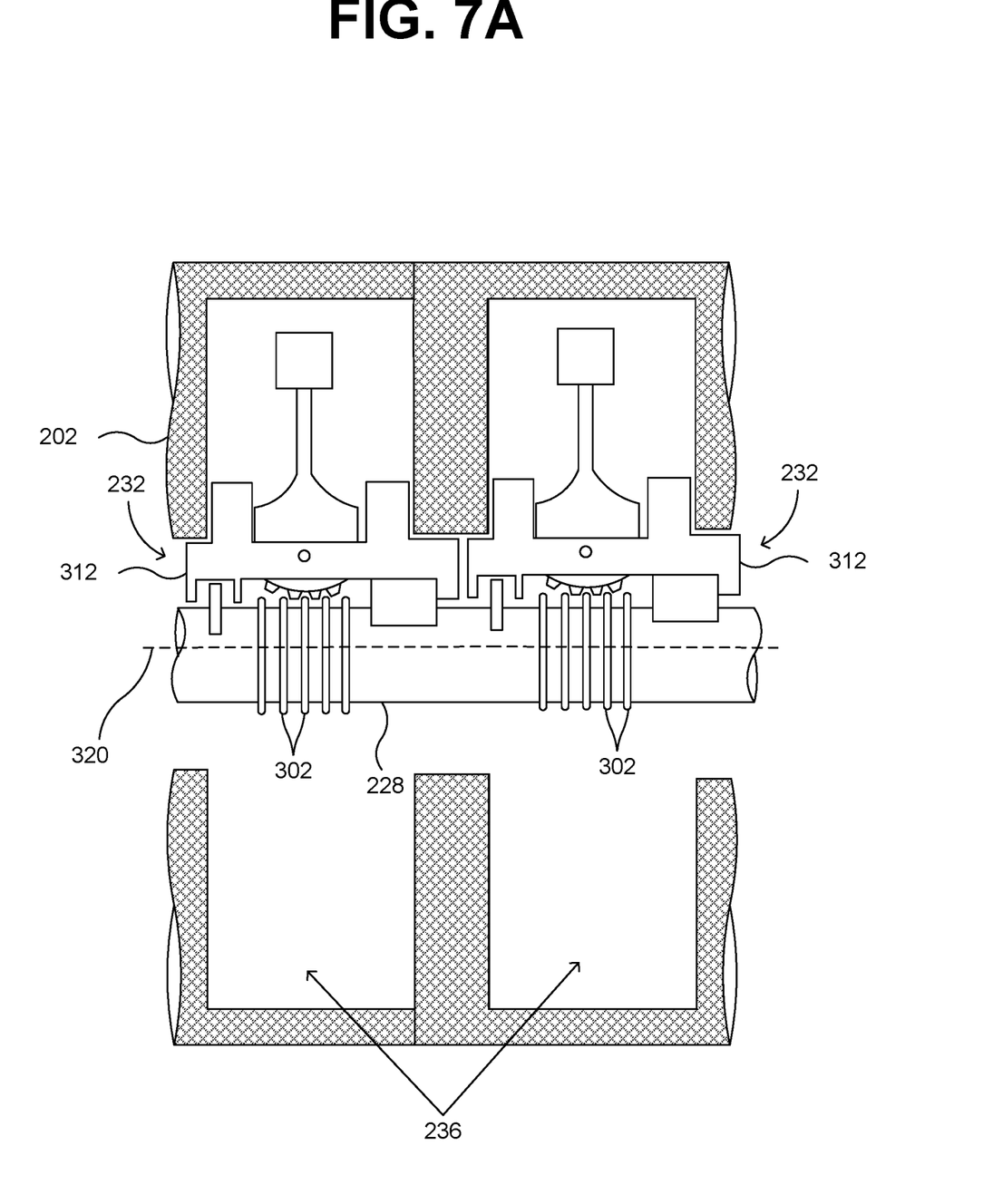
FIG. 7A illustrates an example turbopump with multiple axial counterbalances.
Figure 7B:
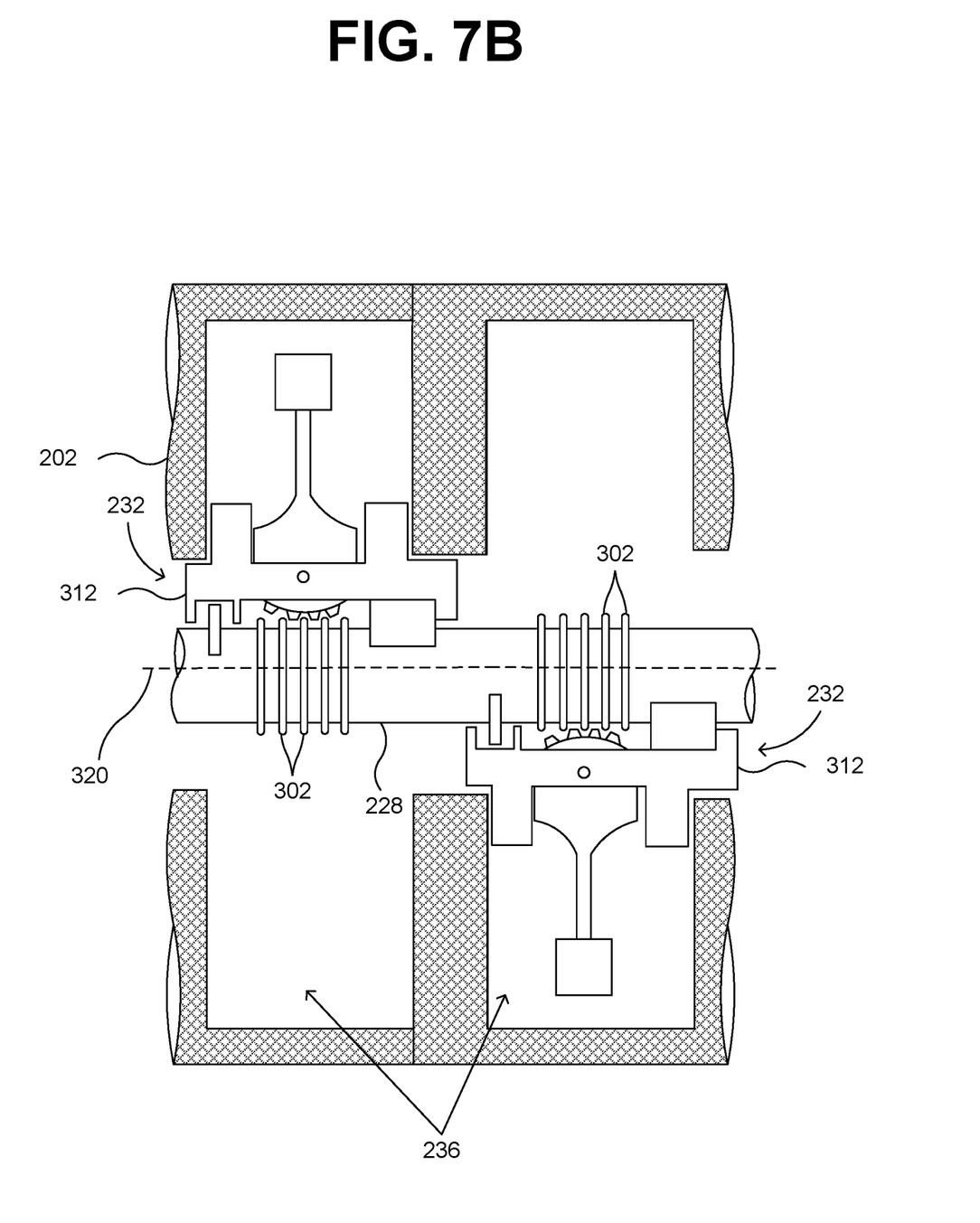
FIG. 7B illustrates an example turbopump with multiple axial counterbalances.
Figure 8:
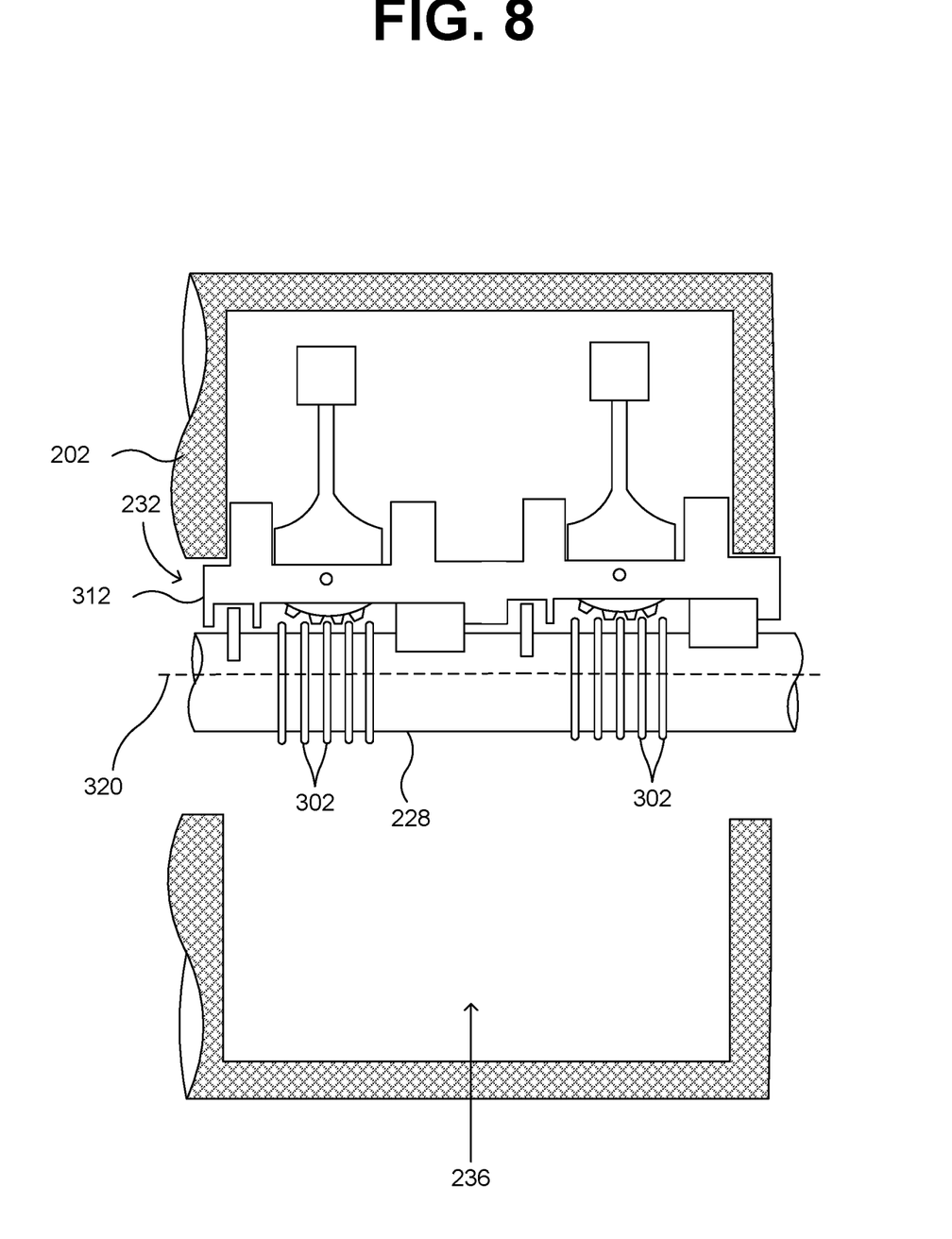
FIG. 8 illustrates an example turbopump with multiple axial counterbalances.

Though a single axial counterbalance is shown, the turbopump 200 can include multiple axial counterbalances (FIGS. 7A, 7B). The multiple axial counterbalances can share the same cavity (FIG. 8) or can have individual cavities (FIGS. 7A, 7B). The multiple axial counterbalances can also share the same bracket (FIG. 8). The multiple axial counterbalances can be out-of-phase around the shaft 228 (FIG. 7B), such that at least two counterbalances do not share the same Cartesian or transverse plane.

Alternatively, or in addition to multiple axial counterbalances, the axial counterbalance can be scaled (i.e., made larger or smaller) based on the amount of axial thrust to be offset. When two or more axial counterbalances are used, the axial counterbalances can have different sizes.

The casing 202 also includes a turbine inlet 222 in fluid communication with a turbine outlet 206 via a turbine chamber 230. The turbine inlet 222 can be a hole, opening, or channel to receive gas to cause a turbine 226 to spin. The turbine outlet 206 can be a hole, opening, or channel from which the gas that turns the turbine 226 is expelled. The turbine chamber 230 is a space or cavity within the casing 202 being sized and shaped to house the turbine 226.

The turbopump 200 also includes bearings 218, 220 to constrain axial or translation motion, while permitting rotation of the rotor 224 and reducing friction between the rotor 224 and another component, including the casing 202.

Figure 3:
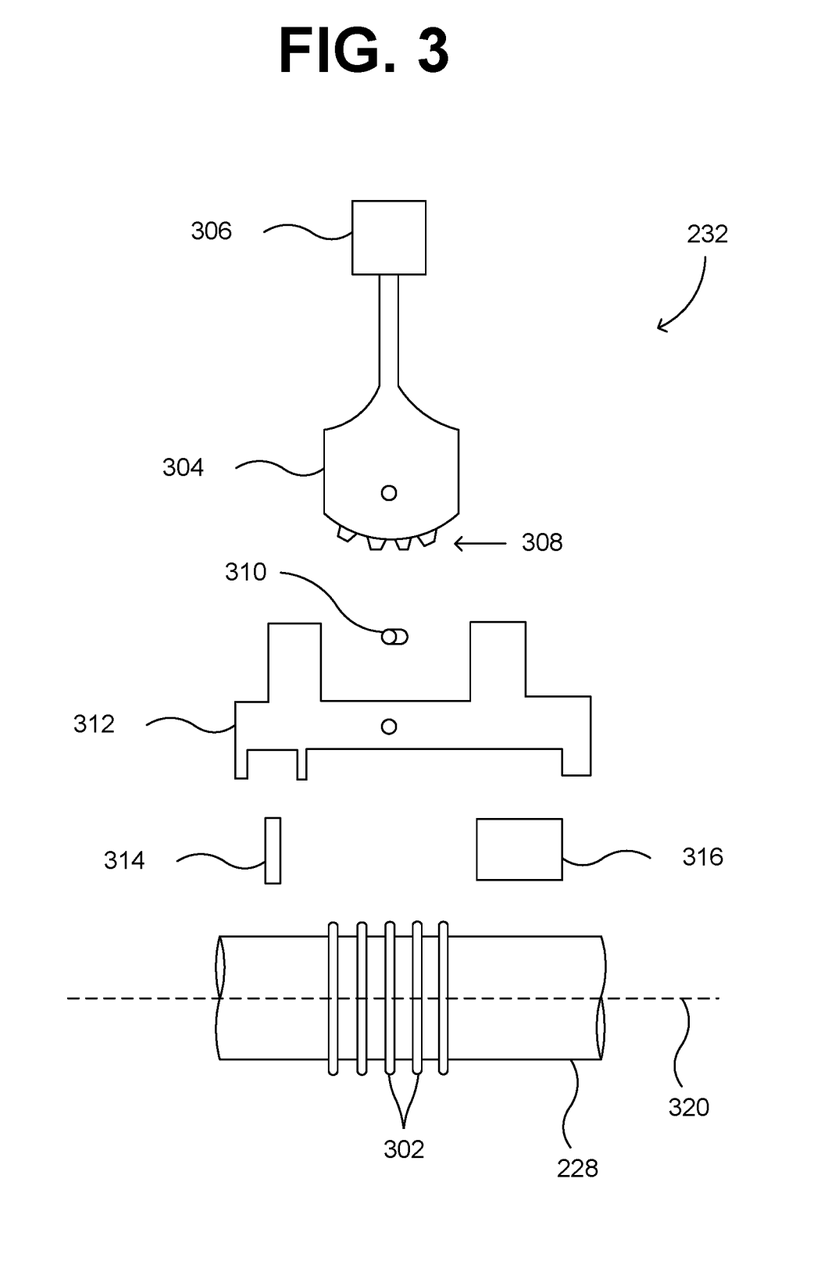
FIG. 3 illustrates an example axial counterbalance.

FIG. 3 shows an exploded view of the axial counterbalance 232. The axial counterbalance 232 includes a swing arm 304, a rack and pinion system formed from teeth 302 on the shaft 228 and teeth 308 on the swing arm 304, and a bracket 312. The teeth 302 can be protrusions or threads extending circumferentially around the shaft 228.

The swing arm 304 is rotatably attached to the bracket 312, such as with a pin 310. Therefore, as the shaft 228 and the bracket 312 move linearly (i.e., along or relative to an axis), the swing arm 304 rotates about an axis.

The swing arm 304 includes the teeth 308 at a first end. The teeth 308 can be protrusions extending outwardly from the first end of the swing arm 304. The teeth 308, acting like the pinion of a rack and pinion system, are sized, shaped, and spaced to align with the spaces between the teeth 302 of the shaft 228.

Figure 4A:
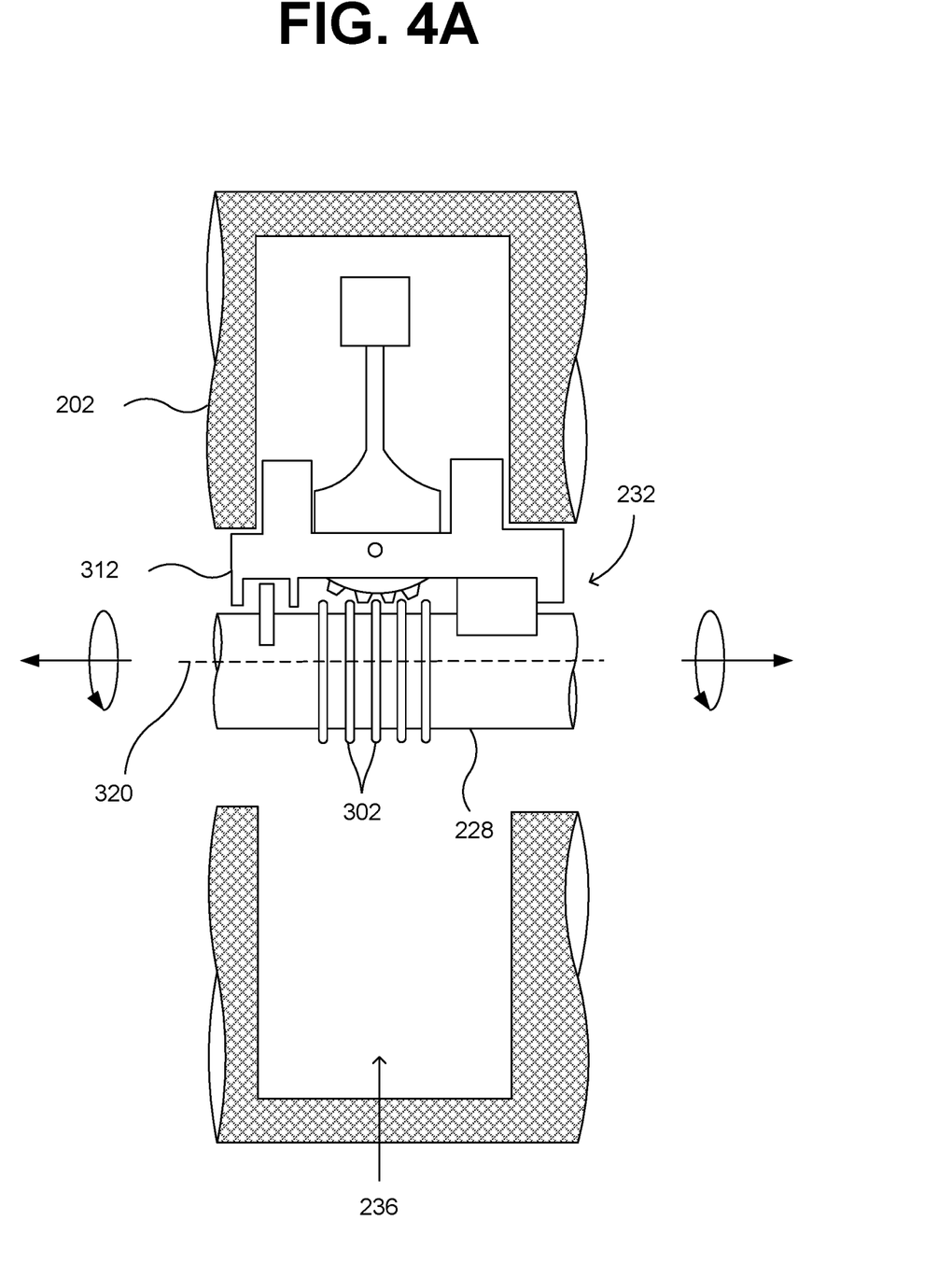
FIG. 4A illustrates an example axial counterbalance in a first position.
Figure 4B:
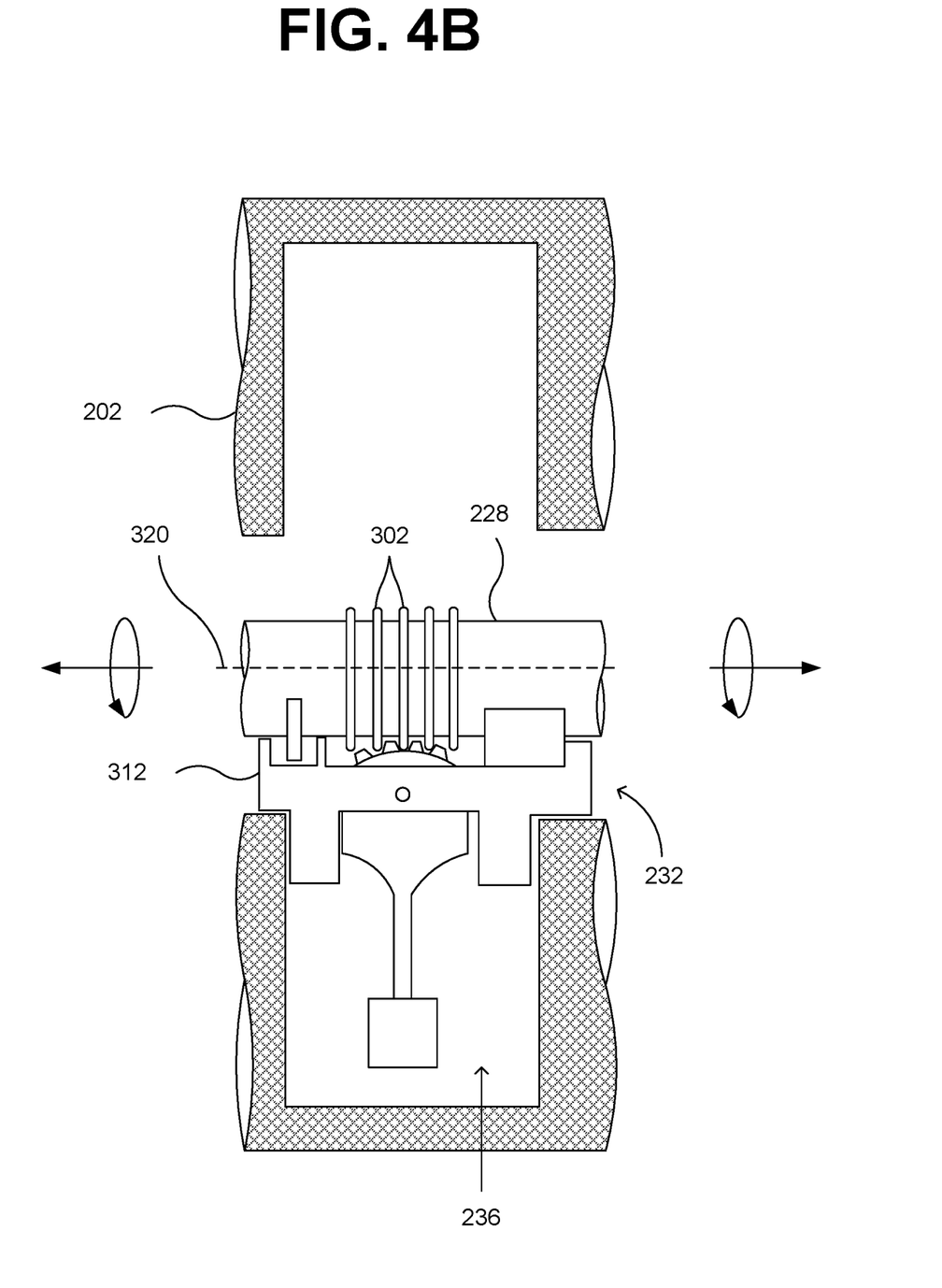
FIG. 4B illustrates the example axial counterbalance in a second position.

The axial counterbalance 232 can also include splines 314, 316 which affix the bracket 312 to the shaft 228. Affixing the shaft 228 to the bracket 312 transfers torque from the shaft 228 to the bracket 312, which causes the axial counterbalance 232 to rotate with the shaft 228 (FIGS. 4A-4B). Affixing the shaft 228 to the bracket 312 also transfers axial thrust from the shaft 228 to the bracket 312, which causes the bracket 312 to translate with the shaft 228 (FIGS. 5A-5B) which causes the swing arm 304 to rotate relative to the bracket 312. Though the rotation and translation are shown as different processes providing different component orientations, rotation and translation can occur concurrently (i.e., the shaft 228 and the axial counterbalance 232 rotate around and translate along the axis 320).

The swing arm 304 can also include a weight 306 added to a second end of the swing arm 306. The second end of the swing arm 304 is opposite the first end having the teeth 308. The weight 306 (e.g., a force generator) can increase the mass of the swing arm 304 (and the axial counterbalance 232, more generally) to increase the angular momentum of the axial counterbalance 232 relative to the angular momentum when other factors (e.g., velocity and radius) remain constant. The radius (i.e., length of the swing arm 304) can be increased or decreased based on the placement of the weight 306 or the size or shape of the swing arm 304. Angular momentum varies with the square of the radius (i.e., $r^2$). Therefore, angular momentum changes exponentially with a change in radius (e.g., increase or decrease).

FIG. 4A shows the axial counterbalance 232 in a first position (e.g., nominal or initial position). FIG. 4B shows the axial counterbalance 232 in a second position. The axial counterbalance 232 moves from the first position to the second position when the shaft 228 rotates around an axis 320. The splines 314, 316 transfer the torque of the shaft 228 to the bracket 312, which causes the axial counterbalance 232 to rotate with the shaft 228. The axial counterbalance 232 rotates at the same rotational speed (e.g., rotations per minute, or RPM) as the shaft 228 rotating around the axis 320. Though FIGS. 4A and 4B show the axial counterbalance 232 being rotated 180° from the first position to the second position, the axial counterbalance 232 can rotate any number of degrees, including up to 360° and multiples or portions thereof.

The rotation of the axial counterbalance 232 around an axis can generate an angular momentum to offset (i.e., reduce or eliminate) axial forces exerted on the shaft 228 by the conversion of the low-pressure fluid to the high-pressure fluid.

Figure 5A:
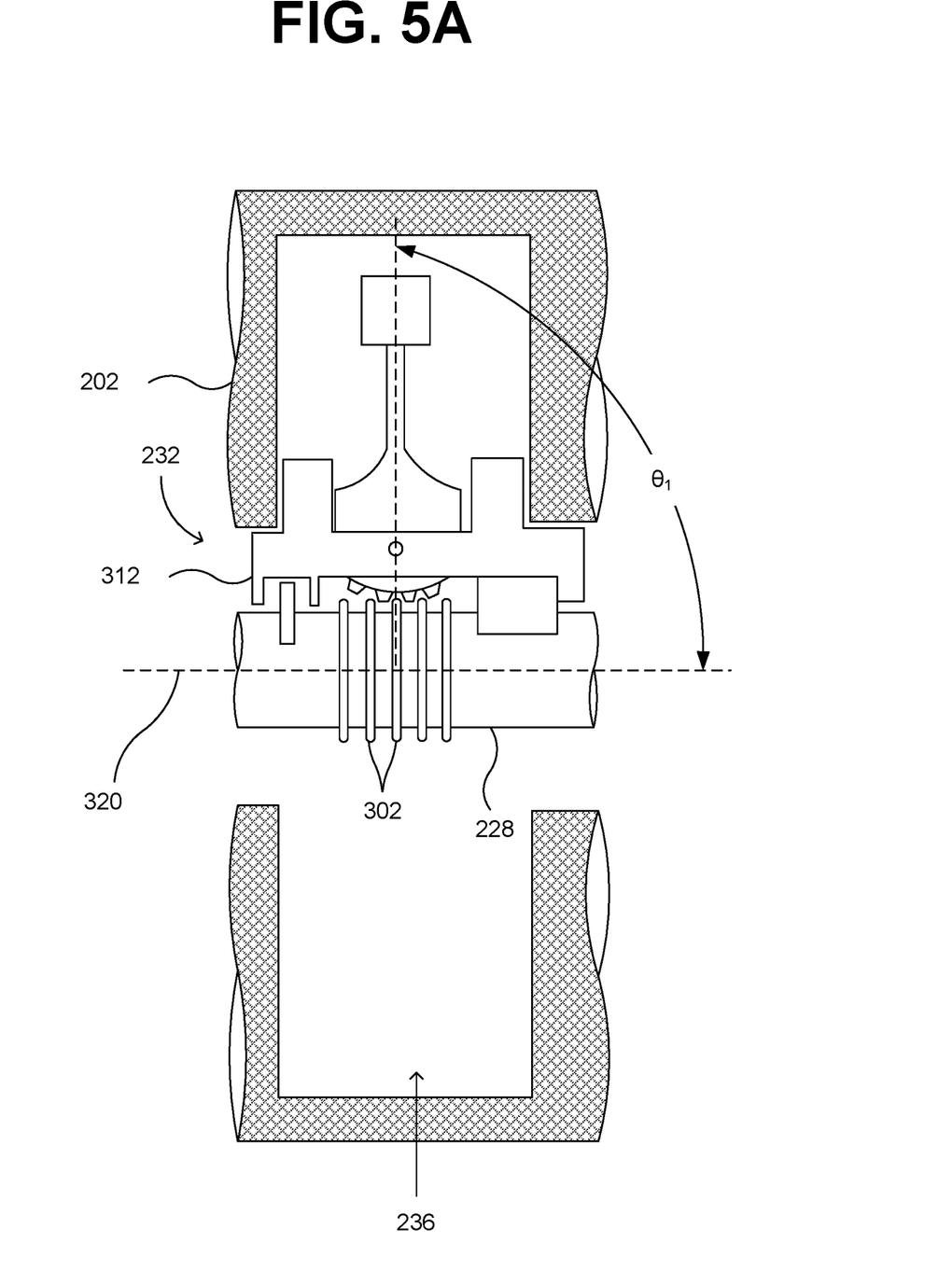
FIG. 5A illustrates an example swing arm in a first position.
Figure 5B:
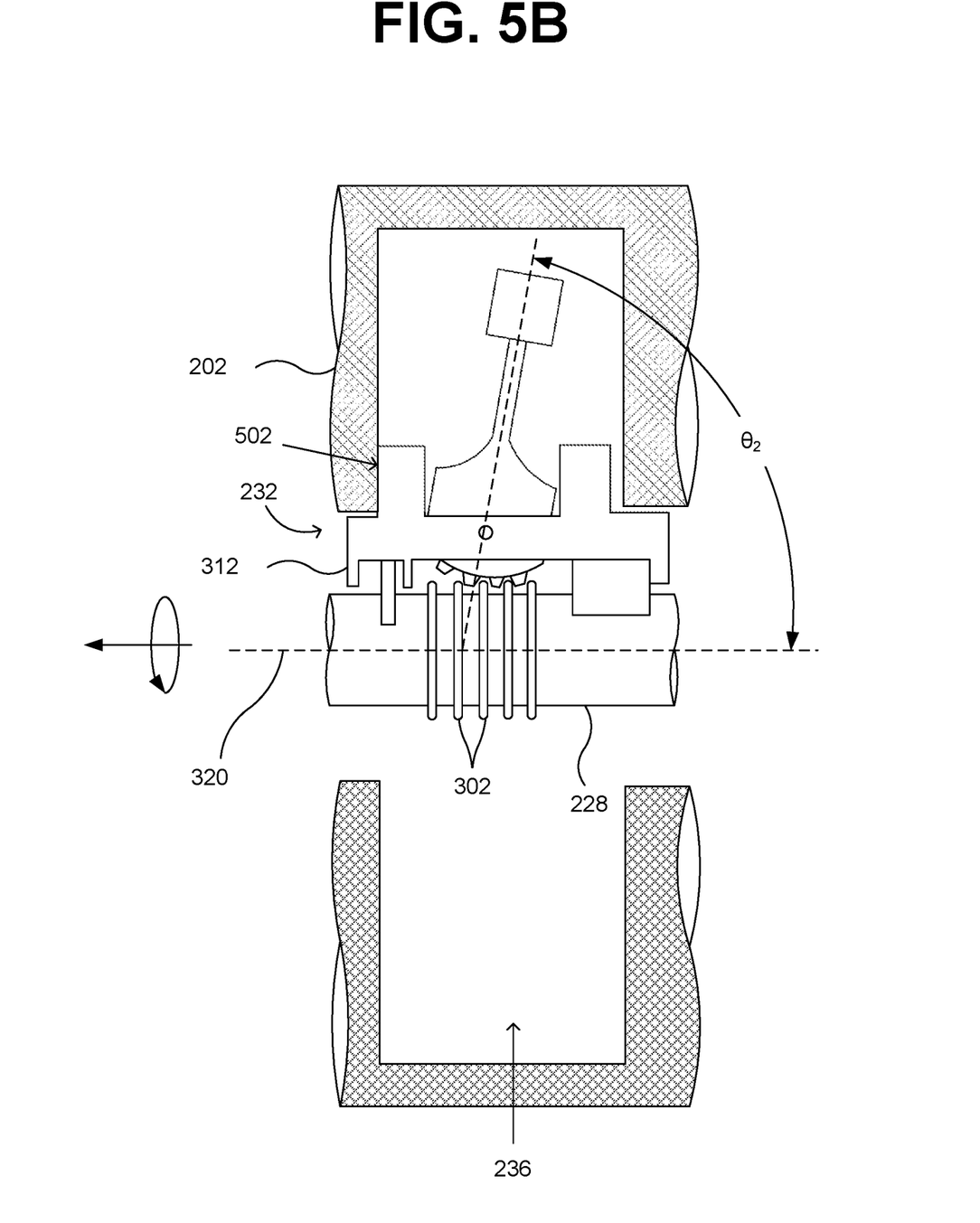
FIG. 5B illustrates the example swing arm in a second position.

FIG. 5A shows the axial counterbalance 232 in a first position (e.g., nominal or initial position). FIG. 5B shows the axial counterbalance 232 in a second position. The axial counterbalance 232 moves from the first position to the second position as the shaft 228 translates along the axis 320 (e.g., to the left, as shown in FIG. 5B). The splines 314, 316 and the bracket 312 transfer axial forces to the bracket 312, which causes the bracket 312 to translate with the axial movement of the shaft 228. As the shaft 228 translates along the axis 320, the teeth 302 of the shaft 228 engage with and push the teeth 308 of the swing arm 304 in the same direction. Therefore, the swing arm 304 rotates from a first angle ($\theta_1$) to a second angle ($\theta_2$). The first and second angles ($\theta_1$, $\theta_2$) are angles of the swing arm 304 relative to the shaft 228. The swing arm 304 rotates in a direction based on the axial translation of the shaft 228 (e.g., if the shaft 228 moves to the left, the swing arm 304 rotates clockwise; if the shaft 228 moves to the right, the swing arm 304 rotates counter-clockwise). The first and second angles ($\theta_1$, $\theta_2$) can be between 0° and 180°.

The movement of the swing arm 304 relative to the shaft 228 and the bracket 312 can generate linear momentum (i.e., rotational movement of the swing arm 304 has a linear component) to offset axial forces exerted on the shaft 228 by the conversion of the low pressure fluid to the high pressure fluid.

Though rotation and translation of the axial counterbalance 232 are shown separately, the axial counterbalance 232 can be simultaneously rotated around the axis 320 and translated along the axis 320. Rotation and translation of the axial counterbalance 232, whether alone or in combination, can offset (i.e., reduce or eliminate) axial forces exerted on the shaft 228. The axial counterbalance 232 can offset the axial forces by generating opposing forces, providing a surface against which the axial forces can be dissipated, or the like. For example, the axial forces exerted on the shaft 228 by the conversion of the low-pressure fluid to the high-pressure fluid can be at least 40,000 pounds of force, at least 100,000 pounds of force, or the like.

For example, the axial counterbalance 232 can offset a larger range of axial thrust forces while coupling this ability to a rotational speed (e.g., rotations per minute, or RPMs) of the shaft 228. The increase in RPMs can increase an offset in axial forces by the axial counterbalance 232. The increase in RPMs can increase angular momentum of the axial counterbalance 232. The increase in angular momentum can be used to offset (i.e., reduce or eliminate) increasing or larger axial forces. As another example, the axial counterbalance 232 can offset a larger range of axial thrust forces by increasing the mass of the swing arm 304, including by adding the weight 306 to the swing arm 304. As the mass increases (and other factors remain constant), the angular momentum increases. In yet another example, the axial thrust forces can be offset by both coupling the axial counterbalance 232 to RPMs and increasing the mass of the swing arm 304.

In one example, when the linear momentum of the axial thrust exceeds the angular momentum of the rotating swing arm 304, the bracket 312 contacts an internal wall of the casing 202 at a wall-bracket interface 502. The energy associated with the force of the axials thrust can be dissipated through the frictional force between the bracket 312 and the internal wall at the wall-bracket interface 502.

Figure 6:
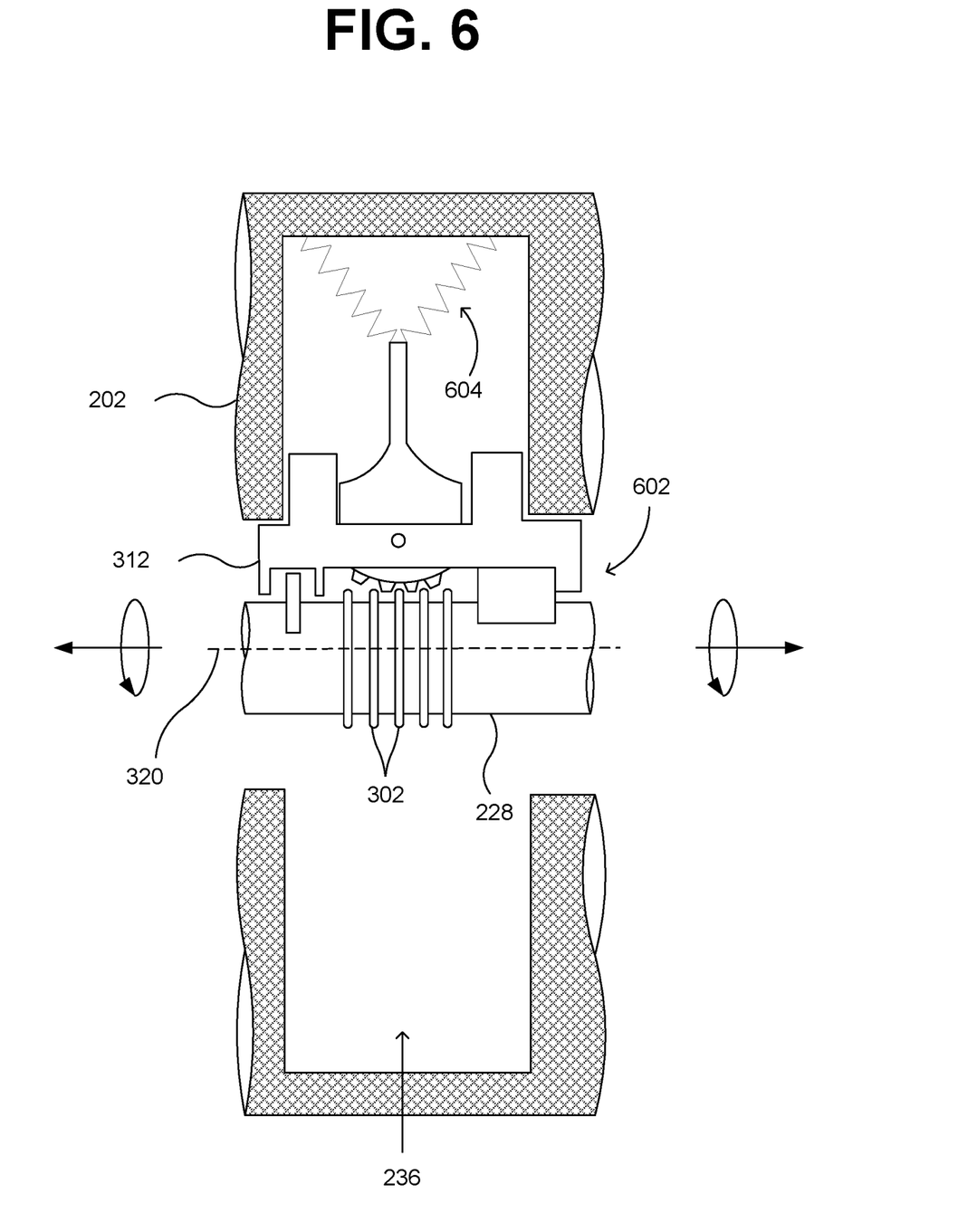
FIG. 6 illustrates an example axial counterbalance.

FIG. 6 shows an axial counterbalance 602. The axial counterbalance 602 is similar to the axial counterbalance 232, except that the axial counterbalance 602 includes a spring 604 (e.g., a force generator). The spring 604 can be fixed at both end points (i.e., an attachment point on a casing and a bracket) or can be fixed at one end point and slidable at another end point (i.e., slidable with respective to the casing and fixed to the bracket). The spring 604 can provide a tensive force, a compressive, or a pre-loaded force to offset or eliminate the force produced by or exerted on the shaft 228.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A turbopump, comprising:
   a shaft;
   a shaft protrusion extending circumferentially around the shaft; and
   an axial counterbalance including:
      a swing arm;
      a swing arm protrusion positioned at a first end of the swing arm, the swing arm protrusion positioned to engage with the shaft protrusion of the shaft; and
      a force generator structured to produce a force in a direction opposite a direction of a force produced by or exerted on the shaft.

2. The turbopump of claim 1, wherein the force generator is attached to a second end of the swing arm, the second end opposite the first end.

3. The turbopump of claim 2, wherein the force generator is a weight that increases a mass of the swing arm.

4. The turbopump of claim 3, wherein the swing arm and the weight collectively have a mass that generates an angular momentum that reduces or eliminates a linear momentum caused by axial movement of the shaft.

5. The turbopump of claim 4, wherein the angular momentum of the swing arm and the weight cause the swing arm and the weight to rotate relative to the shaft.

6. The turbopump of claim 4, wherein the mass is at least 40,000 pounds.

7. The turbopump of claim 4, wherein the mass is at least 100,000 pounds.

8. The turbopump of claim 1, further comprising a casing to house the shaft and the axial counterbalance, the casing having a static support structured to provide a surface against which a bracket can press and dissipate energy via a friction force when the shaft moves along an axis and causes the bracket to also move relative to the axis.

9. The turbopump of claim 8, wherein the static support is attached to an internal portion or an internal sidewall of the casing.

10. The turbopump of claim 8, wherein the static support is an internal wall of the casing.

11. The turbopump of claim 10, wherein the internal wall extends circumferentially within the casing and forms a cavity structured to fit the axial counterbalance.

12. The turbopump of claim 1, further comprising a static support to provide a surface against which a bracket can press and dissipate energy via a friction force when the shaft moves along an axis and causes the bracket to also move relative to the axis.

13. The turbopump of the claim 1, further comprising a rotor that includes the shaft, the rotor structured to adjoin an inducer, an impeller, and a turbine.

14. The turbopump of claim 1, further comprising a bearing structured to constrain axial movement of the shaft, to reduce friction between the shaft and a casing, or both.

15. The turbopump of claim 1, wherein movement of the shaft along an axis causes a bracket to move in the same direction as the shaft, the movement of the shaft generating linear momentum.

16. The turbopump of claim 15, wherein the movement of the shaft causes the swing arm to rotate about an axis relative to the shaft and the bracket, the swing arm rotation generating linear momentum, angular momentum, or both in a direction based on the direction of movement of the bracket and the shaft.

17. The turbopump of claim 16, wherein the linear momentum, the angular momentum, or both of the swing arm is in a direction that causes the linear momentum of the shaft to be reduced or eliminated.

18. The turbopump of claim 15, wherein the bracket, in response to the linear momentum, presses against a static support and dissipates energy via a frictional force.

19. The turbopump of claim 1, wherein the force generator pre-loads the force on the swing arm, the pre-loaded force being tension or compression.

20. The turbopump of claim 19, wherein the force generator is a spring.

21. A method for offsetting axial thrust generated by a turbopump, the method comprising:
   affixing a bracket to a shaft via splines, the shaft having a shaft protrusion;
   causing a swing arm protrusion of a swing arm to engage with the shaft protrusion of the shaft, the swing arm being rotatably attached to the bracket; and
   causing the swing arm to generate an opposing force when the shaft rotates around, translates along, or rotates around and translates an axis, the opposing force offsetting the axial thrust.

22. The method of claim 21, wherein the swing arm further comprises a weight to increase a mass of the swing arm.

* * * * *